US012729847B2

(12) United States Patent
Moore

(10) Patent No.: US 12,729,847 B2
(45) Date of Patent: Sep. 8, 2026

(54) ILLUMINATED RULER AND MANUFACTURE METHOD THEREOF

(71) Applicant: Carolina Moore, San Diego, CA (US)

(72) Inventor: Carolina Moore, San Diego, CA (US)

(*) Notice: Subject to any disclaimer, the term of this patent is extended or adjusted under 35 U.S.C. 154(b) by 0 days.

(21) Appl. No.: 18/973,776

(22) Filed: Dec. 9, 2024

(65) Prior Publication Data

US 2025/0189117 A1 Jun. 12, 2025

Related U.S. Application Data

(60) Provisional application No. 63/608,105, filed on Dec. 8, 2023.

(51) Int. Cl.

| | |
|---|---|
| ***F21V 33/00*** | (2006.01) |
| ***F21L 4/08*** | (2006.01) |
| ***F21V 8/00*** | (2006.01) |
| ***F21V 23/04*** | (2006.01) |
| ***G01B 3/04*** | (2006.01) |

(52) U.S. Cl.

CPC ............ *F21V 33/0084* (2013.01); *G01B 3/04* (2013.01); *G02B 6/0068* (2013.01); *G02B 6/0091* (2013.01); *F21L 4/08* (2013.01); *F21V 23/04* (2013.01)

(58) Field of Classification Search

CPC ....... F21V 33/0084; F21V 23/04; G01B 3/04; G02B 6/0068; G02B 6/0091; F21L 4/08

See application file for complete search history.

(56) References Cited

U.S. PATENT DOCUMENTS

| | | | | | |
|---|---|---|---|---|---|
| 2,034,529 | A * | 3/1936 | Olsen | G03F 1/90 | 33/645 |
| 2,048,221 | A * | 7/1936 | Redding | 33/437 | |
| 2,378,249 | A * | 6/1945 | Ruth | G03D 15/04 | 362/89 |
| 2,444,723 | A * | 7/1948 | Bowen | G03D 15/04 | 362/89 |
| 3,410,994 | A * | 11/1968 | Facto | B26D 1/205 | 83/489 |
| 3,752,974 | A * | 8/1973 | Baker | B60Q 3/14 | 362/627 |

(Continued)

FOREIGN PATENT DOCUMENTS

| | | | |
|---|---|---|---|
| CN | 218095521 | U | 12/2022 |
| EP | 2383126 | A1 * | 11/2011 |

OTHER PUBLICATIONS

CN-210532159-U; Chu, "An LED Table Ruler", 2020. (Year: 2020).*

(Continued)

*Primary Examiner* — Kristina M Deherrera
*Assistant Examiner* — Tania Courson
(74) *Attorney, Agent, or Firm* — Innovent Law P.C.; Karima Gulick

(57) ABSTRACT

A ruler according to the present disclosure comprises a ruler portion and a lighting portion. The ruler portion includes a light guide having a flat first bottom surface and a marking portion formed on the light guide. The lighting portion is coupled with an entry side of the light guide and configured to emit light to enter the light guide through the entry side. The lighting portion has a flat second bottom surface flush with the first bottom surface when the lighting portion is coupled with the ruler portion.

20 Claims, 5 Drawing Sheets

(56) References Cited

U.S. PATENT DOCUMENTS

| | | | | | |
|---|---|---|---|---|---|
| 4,075,467 | A * | 2/1978 | Peterson | B43L 3/001 | 33/492 |
| 5,453,855 | A * | 9/1995 | Nakamura | G02F 1/133605 | 349/68 |
| 5,673,490 | A * | 10/1997 | Hill | B42D 15/0006 | 33/1 G |
| 5,688,035 | A * | 11/1997 | Kashima | G02B 6/0031 | 362/330 |
| 5,819,422 | A * | 10/1998 | Schafer | D05B 97/12 | 33/476 |
| 5,950,340 | A * | 9/1999 | Woo | G09F 13/04 | 362/249.05 |
| 6,415,521 | B1 * | 7/2002 | Schnell | A01K 97/00 | 33/549 |
| 6,454,423 | B1 * | 9/2002 | Suzuki | G02B 6/0086 | 362/223 |
| 6,513,255 | B1 * | 2/2003 | Creekmore | G01B 11/27 | 362/108 |
| 6,615,520 | B2 * | 9/2003 | Landers, Jr. | G02B 6/0021 | 40/564 |
| 6,901,674 | B2 * | 6/2005 | Pieczynski | G01B 3/004 | 33/549 |
| 6,925,724 | B2 * | 8/2005 | Tandy | D05B 97/12 | 33/483 |
| 6,951,403 | B2 * | 10/2005 | Bennett, Jr. | B42D 3/123 | 359/802 |
| 7,121,700 | B1 * | 10/2006 | Scanlon | G09F 21/042 | 362/183 |
| 7,360,940 | B2 * | 4/2008 | Chang | G02B 6/0091 | 362/633 |
| 7,671,936 | B2 * | 3/2010 | Chang | G02B 6/0073 | 362/612 |
| 7,681,347 | B1 * | 3/2010 | Welker | G02B 6/0016 | 40/579 |
| 7,924,361 | B2 * | 4/2011 | Kim | G02F 1/133308 | 349/58 |
| 7,937,864 | B2 * | 5/2011 | Mahajan | G09F 27/00 | 40/457 |
| 7,997,784 | B2 * | 8/2011 | Tsai | G02B 6/0068 | 362/621 |
| 8,242,936 | B2 * | 8/2012 | Liu | G06F 3/041 | 463/31 |
| 8,480,286 | B2 * | 7/2013 | Tsai | G02B 6/0021 | 362/612 |
| 8,619,229 | B2 * | 12/2013 | Jang | G02B 6/0091 | 349/150 |
| 9,726,810 | B2 * | 8/2017 | Kim | G02B 6/0021 | |
| 9,983,340 | B2 * | 5/2018 | McCollum | G02B 6/0018 | |
| 10,962,701 | B2 * | 3/2021 | Vasylyev | G02B 6/005 | |
| 11,231,530 | B1 * | 1/2022 | Parker | G02B 5/08 | |
| 2002/0191387 | A1 * | 12/2002 | Cha | G02B 6/0013 | 362/558 |
| 2003/0123245 | A1 * | 7/2003 | Parker | G02B 6/0061 | 362/602 |
| 2005/0052860 | A1 * | 3/2005 | Tsai | G02B 6/0083 | 362/97.3 |
| 2005/0178013 | A1 * | 8/2005 | Schafer | B43L 7/027 | 33/1 B |
| 2006/0104091 | A1 * | 5/2006 | Chen | G02B 6/002 | 362/621 |
| 2006/0260146 | A1 * | 11/2006 | Manning | B43L 7/00 | 33/483 |
| 2006/0278718 | A1 * | 12/2006 | Senter | G09F 3/207 | 235/491 |
| 2007/0008739 | A1 * | 1/2007 | Kim | G02B 6/0021 | 362/624 |
| 2010/0275456 | A1 * | 11/2010 | Lord | G01D 7/00 | 33/763 |
| 2011/0084630 | A1 * | 4/2011 | Cheng | G02B 6/001 | 315/313 |

OTHER PUBLICATIONS

CN-2649351-Y; Zheng, "Luminous Ruler", 2004. (Year: 2004).*
CN-201224270-Y; Yang et al., "Luminous Ruler", 2009. (Year: 2009).*
KR-200297622-Y1; "Lighting Ruler", 2002. (Year: 2002).*

* cited by examiner

ILLUMINATED RULER AND MANUFACTURE METHOD THEREOF

CROSS REFERENCE TO RELATED APPLICATIONS

The present application claims benefit of U.S. Provisional Application No. 63/608,105 filed on Dec. 8, 2024, entitled "ILLUMINATED RULER AND MANUFACTURE METHOD THEREOF."

FIELD OF THE INVENTION

The present invention relates generally to geometrical instruments and, more particularly, to illuminated quilting ruler.

BACKGROUND OF THE INVENTION

It is known to provide rulers for use in quilting, which are provided with a series of markings to enable the quilter to measure and cut the fabric to be used in the production of the quilt according to specific predetermined measurements in order to follow a pattern. Because a large number of pieces of fabric are required for each article, it is necessary for the ruler to be clear and easy to use.

The markings on the rulers are either printed or etched on the ruler substrate. The problem with printed markings is that they can easily be erased by rubbing or scratching. On the other hand, laser etching creates black and white markings and is a very efficient process to permanently form markings on most types of materials. The laser-etched markings are also resistant to being erased by rubbing or scratching. However, the material used to etch markings on the ruler substrate is generally less visible than the ink used to print markings on the ruler substrate. Under poor lighting environment the etched ruler can be less visible to the user than the printed ruler. Thus, there is a need to illuminate ruler with etched markings to make them visible under any lighting environment.

DETAILED DESCRIPTION

Figure 1:
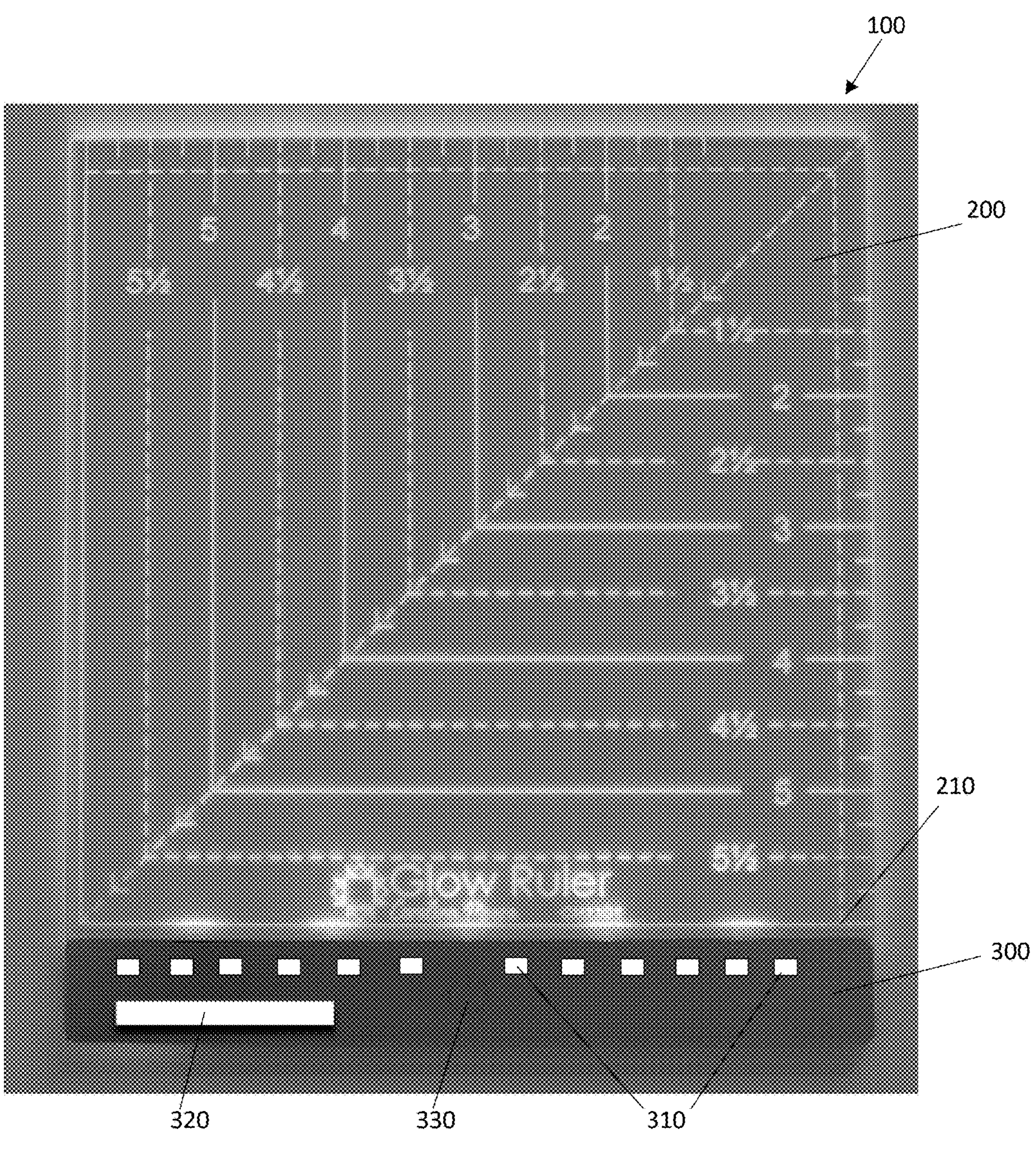
FIG. 1 is a top view of the ruler according to a first embodiment of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

The detailed descriptions set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Figure 2:
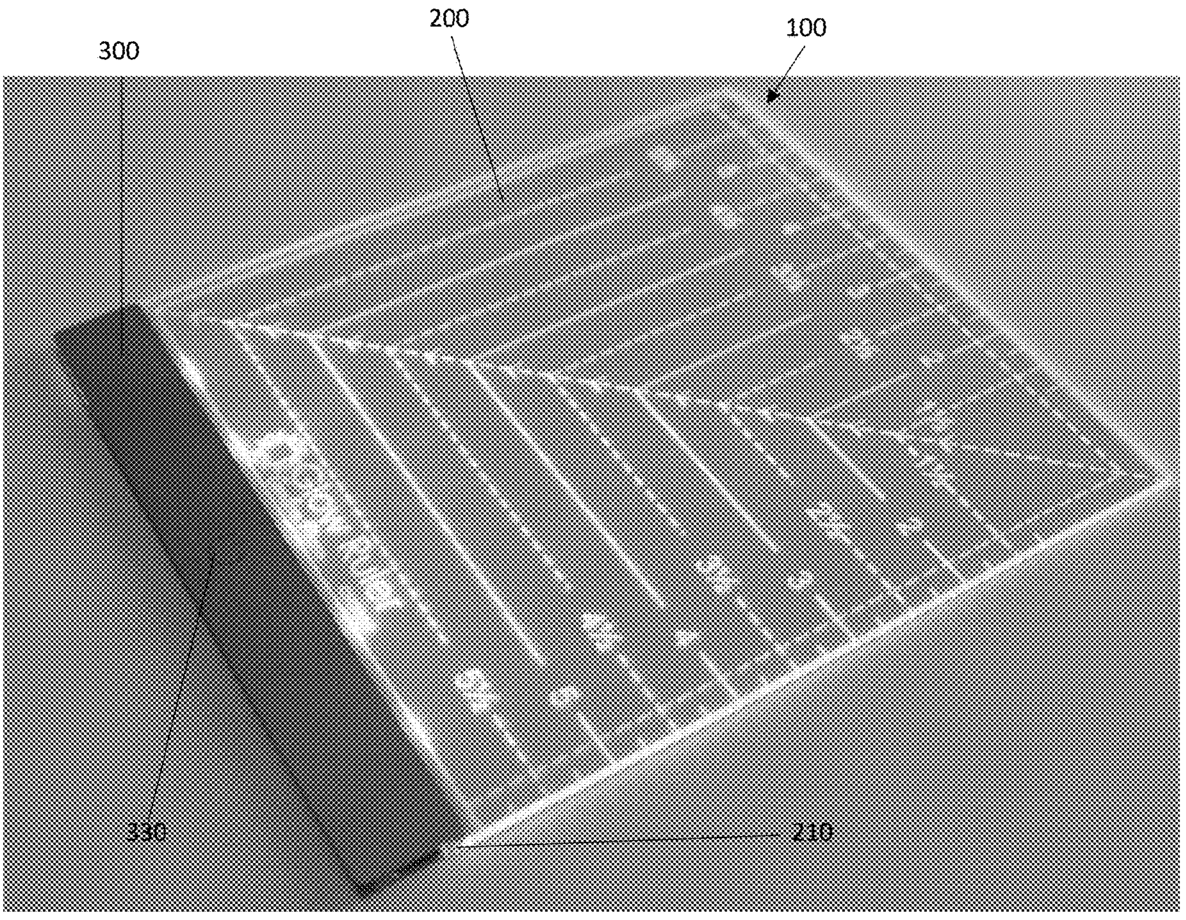
FIG. 2 is a perspective view of the ruler according to the first embodiment.

FIGS. 1 and 2 are respectively a top view and a perspective view of the ruler 100 according to a first embodiment of the present disclosure. The ruler 100 in FIG. 1 is a quilting rulers with length measurement markings along multiple edges and degree angle markings.

The ruler 100 includes a ruler portion and a lighting portion 300. The ruler portion includes a transparent light guide 200 and a plurality of markings disposed on the light guide 200. The light guide 200 is an optical waveguide and has a physical structure that guides electromagnetic waves in the optical spectrum. The light guide 200 is usually made of acrylic, glass, or polycarbonate. The light guide 200 of the first embodiment is made of acrylic which is lightweight, durable, and versatile. Acrylic provides excellent clarity and is easier to work with in terms of cutting and shaping. Acrylic is also shatter-resistant, making it a safe option for personal use.

The lighting portion 300 generates light that enters the light guide 200 at some critical angles that allows the light to be trapped inside the light guide 200 because of a phenomenon called total internal reflection. Once trapped, the light remains inside the light guide 200 until it is extracted by an extraction feature, is absorbed by the material, or exits the surface of the light guide 200 at angles other than the above-mentioned critical angles.

Further, the light guide 200 of the present embodiment is rectangular. However, in different embodiments, the light guide 200 can have other shapes such as circle, oval, triangle, rhombus, trapezoid, hexagon, octagon, pentagon etc.

In the present embodiment, the markings are formed on the light guide 200 using laser to melt the surface of the light guide 200, i.e. laser-etched on the light guide 200. The laser-etching process involves selectively removing microscopic layers of the light guide 200, thus creating visible marks on its treated surface. Depending on the materials of the light guide 200, the laser-material interactions can be different. Unlike printed graphics, which can fade or become damaged over time, laser-etched designs are permanent. The engraving process preferably leaves an indelible mark on the bottom surface of the light guide 200, making it resistant to scratches, UV exposure, and moisture. This durability is ideal for the ruler 100, as etched graphics maintain their integrity for years without needing replacements. Laser-etched surfaces of the light guide 200 require minimal upkeep compared to printed signage or vinyl applications. Since there's no ink or adhesive to degrade, cleaning is simplified, and the ruler 100 remains pristine even after extended use, making it an efficient, low-maintenance option for busy environments.

The markings includes a plurality of numbers to signify length and width. The markings also include forty-five degrees diagonal lines for triangle cuts, markings for half-squares. In different embodiments, the ruler 100 can also include markings for quarter-square triangles. Further, the laser-etching process of the present disclosure preferably forms white markings on the light guide 200. However, in different embodiments, the laser-etching can also form markings that have other colors such as black, blue, red, etc. In the first embodiment, the markings on the light guide 200 are quilting markings for the user to make precise measurements for quilting purpose. In different embodiments, the markings on the light guide 200 can have different length, curves, and angles for other measurement purposes.

As illustrated in FIGS. 1-2, the lighting portion 300 is attached to one side of the light guide 200. More specifically, the lighting portion 300 is coupled with the light entry side 210 of the light guide 200, wherein the light generated by the lighting portion 300 enters the light guide 200 through the light entry side 210. The light is trapped inside the light guide 200, travels within the light guide 200, and eventually exits through other sides of the light guide 200. The markings are preferably white but can have other colors depending on factors such as the color of light generated by the lighting portion 300 and user preferences.

The lighting portion 300 includes a plurality of light sources 310, a battery 320, and a power switch 330. The light sources 310 are preferably distributed along the light entry side 210 of the light guide 200 and electrically connected to the battery 320. The power switch 330 is electrically connected to the battery 320 and is configured to complete an electrical circuit for the battery 320 to power the light sources 310 or break the electrical circuit so that the battery 320 can stop powering the light sources 310. The light sources 310 preferably include light emitting diodes (LEDs) that use significantly less power than traditional lighting, lowering energy consumption and costs. LEDs also have an extended lifespan, which means reduced maintenance and fewer replacements, both positive factors for environmentally conscious design. However, in different embodiments, the light sources 310 can include other light alternatives such as fluorescent tube and EcoHalogen.

The lighting portion 300 further includes a charger port (not illustrated) electrically connected to the battery 320 and configured to accept various types of Universal Serial Bus (USB) plugs or electrical plugs to charge the battery 320. In different embodiments, the battery 320 can also be replaceable one such as a button battery.

In other embodiments, the power switch 330 can be configured to include a user interface, such as a button or a touch screen, for accepting user input and changing the color of light generated by the light sources 310.

In the embodiment illustrated in FIGS. 1-2, the lighting portion 300 is affixed on the light entry side 210 of the light guide 200. However, in different embodiments, the lighting portion 300 can be configured to be detachably coupled with the light guide 200. For instance, the lighting portion 300 can be fitted with a clip, either flexible or worked by a spring, for holding onto the light entry side 210 of the light guide 200. One lighting portion 300 of the present disclosure can be configured to generate light of one color and be replaced with another lighting portion 300 configured to generate light of a different color. Accordingly, the user can freely change the lighting portion 300 attached to the light guide 200 to change the color of the light generated or the overall ornamental appearance of the ruler.

Figure 3:
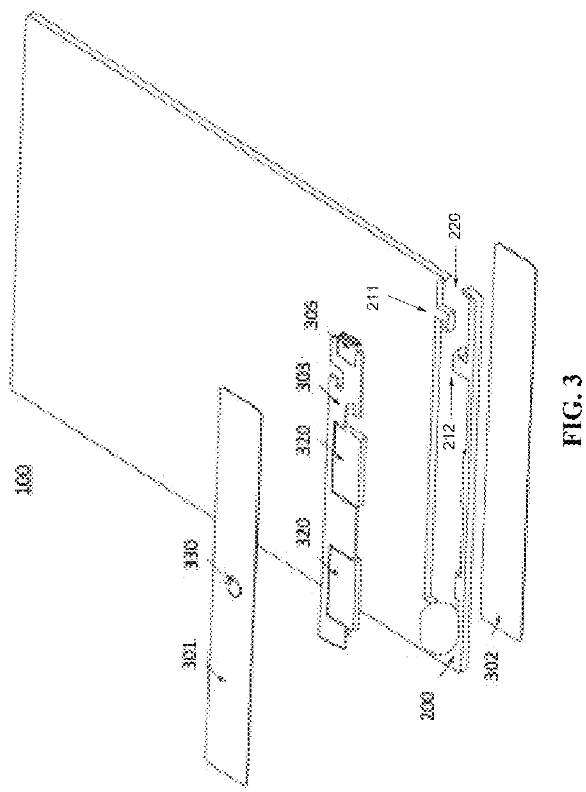
FIG. 3 is an exploded view of the ruler according to the first embodiment.

FIG. 3 is an exploded view of the ruler 100 according to the first embodiment. The lighting portion 300 includes a first cover 301 and a second cover 302, wherein the first and second covers 301, 302 are both made of metal stainless steel (but not limited thereto).

The lighting portion 300 further includes an integrated circuit board 303, batteries 320, and a charging interface 305. The batteries 320 of the first embodiment is a polymer lithium battery (but not limited thereto) electrically connected to the integrated circuit board 303 and the charging interface 305. The integrated circuit board 303 preferably has a control module, a resistor, a capacitor, and at least one light emitting diode (LED). The batteries 320 has a positive and a negative electrodes electrically connected to the positive and negative electrodes of the integrated circuit board 303. The integrated circuit board 303 and the batteries 320 are enclosed between the first and second covers 301, 302, wherein the first cover 301 has a power switch 330. In the present embodiment, the power switch 330 is a movable part, wherein a user can apply pressure on the power switch 330 and move the power switch 330 toward the integrated circuit board 303 to complete an electrical circuit that includes the first cover 301, the integrated circuit board 303, and the batteries 320. A current can then flow around the above-mentioned circuit in order for the LED to start emitting light. Further, the first and second covers 301, 302 can shield external electric field.

Figure 4:
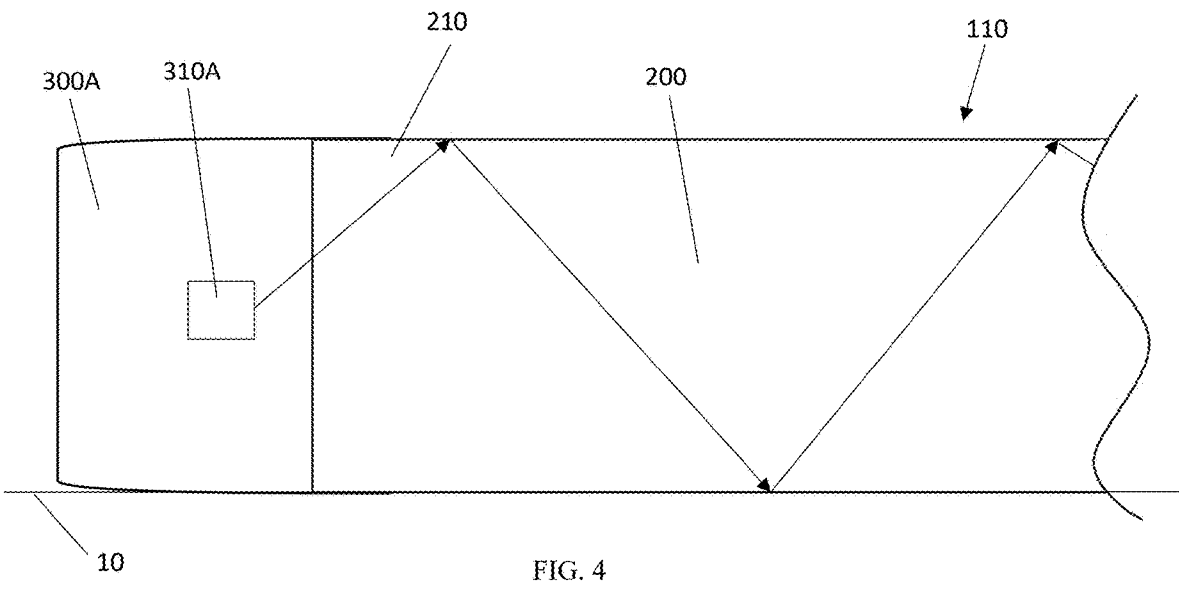
FIG. 4 is a side cross-section view of a ruler system placed on a fabric according to a second embodiment of the present disclosure.

FIG. 4 is a side cross-section view of a ruler system 110 according to a second embodiment of the ruler 100 placed on a fabric 10.

In some embodiments, the light guide 200 includes a gap 220. The gap 220 is disposed on at least a portion of the light guide 200. The gap 220 is bordered by the light entry side 210 and two interior sides of the light guide 200. A first hook 211 connects to a first portion of the plurality of light sources 310 and a second hook 212 connects to a second portion of the plurality of light sources 310.

Figure 5:
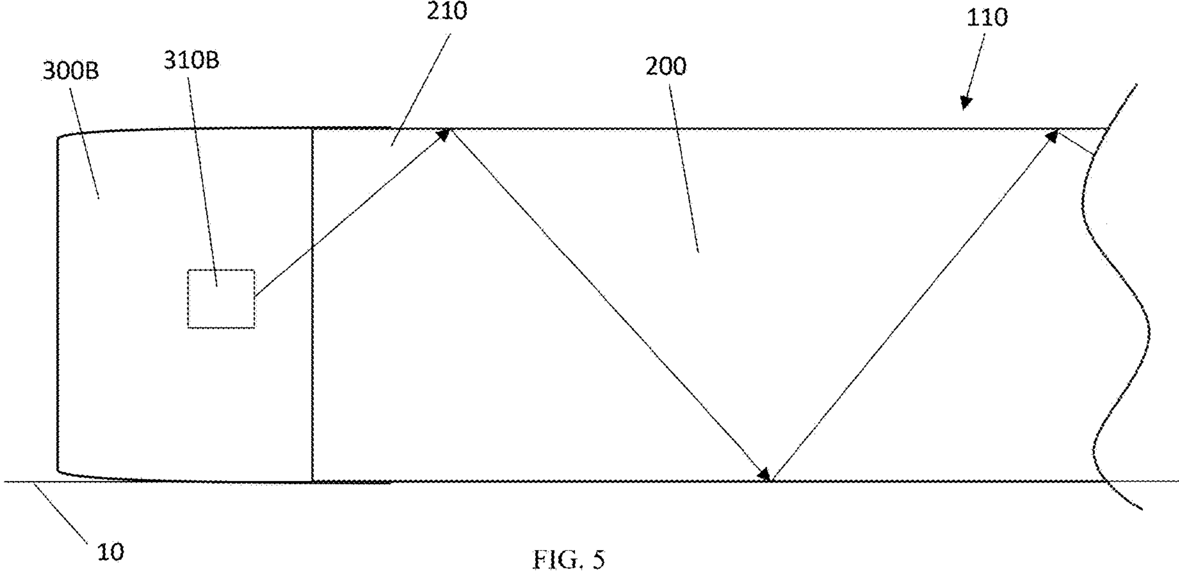
FIG. 5 is another side cross-section view of the ruler system placed on a fabric according to the second embodiment.

As mentioned above, the first lighting portion 300A is detachably coupled with the light guide 200 and be decoupled from the light guide 200. FIG. 5 is another side cross-section view of the ruler system 110 according to the second embodiment, wherein the first lighting portion 300A is replaced with a second lighting portion 300B. The second lighting portion 300B has at least one second light source 310B configured to generate light whose color is different from that of the light generated by the first light source 310A. In different embodiments, the lighting portions 300A, 300B can have different texture designs and color on their respective surface. This allows the user to choose the lighting portion (300A or 300B) to be coupled with the light guide 200, based on factors such as design and the color of light etc.

Figure 6:
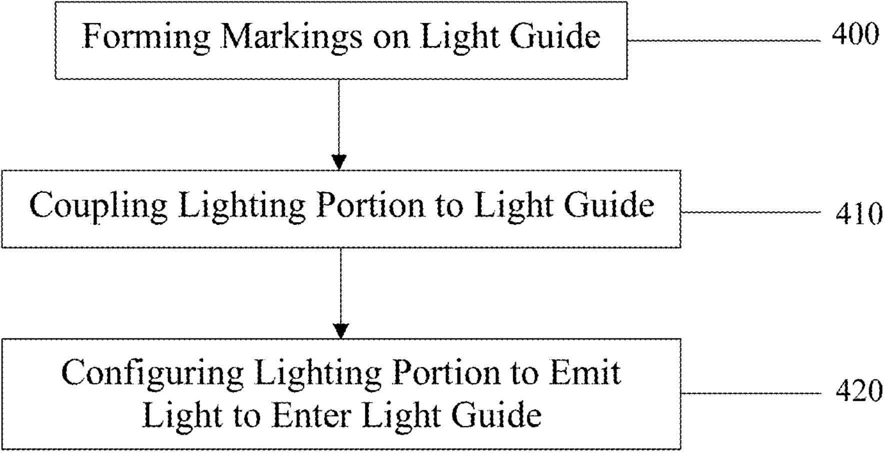
FIG. 6 is a flow chart of a method of making a ruler according to a third embodiment of the present disclosure.

FIG. 6 is a flow chart of a method of making a ruler according to one embodiment of the present disclosure. The method includes step 400 of forming markings on a light guide. The light guide is an optical waveguide having a physical structure that guides electromagnetic waves within. The light guide is usually made of materials such as acrylic, glass, and polycarbonate. Light that enters the light guide within the correct range of angles becomes trapped inside the light guide because of a phenomenon called total internal reflection, or TIR. Once trapped, the light remains inside the guide until it is extracted by an extraction feature, is fully absorbed by the material, or encounters a surface at less than the critical angle. Further, the light guide of the present embodiment is rectangular. However, in different embodiments, the light guide can have other shapes such as circle, oval, triangle, rhombus, trapezoid, hexagon, octagon, pentagon.

On the other hand, the markings are preferably formed on the light guide by using laser to melt the light guide's surface, i.e. laser-etched on the light guide. The laser-etching process involves selectively removing microscopic layers of the light guide, thus creating visible marks on the treated surface of the light guide. Depending on the materials of the light guide, the laser-material interactions can be different. The markings includes a plurality of numbers to signify length and width. The markings can also include forty-five degrees diagonal lines for triangle cuts, markings for half-squares. In different embodiments, the ruler can include markings for quarter-square triangles. Further, the markings are preferably white but can have other colors depending on factors such as the color of light emitted from the lighting portion and user preferences.

In the present embodiment, the markings are formed on the light guide using laser to melt the surface of the light guide, i.e. laser-etched on the light guide. The laser-etching process involves selectively removing microscopic layers of the light guide, thus creating visible marks on its treated surface. Depending on the materials of the light guide, the laser-material interactions can be different. Unlike printed graphics, which can fade or become damaged over time, laser-etched designs are permanent. The engraving process leaves an indelible mark on the surface of the light guide 200, making it resistant to scratches, UV exposure, and moisture. This durability is ideal for the ruler 100, as etched graphics maintain their integrity for years without needing replacements. Laser-etched surfaces of the light guide require minimal upkeep compared to printed signage or vinyl applications. Since there's no ink or adhesive to degrade, cleaning is simplified, and the ruler 100 remains pristine even after extended use, making it an efficient, low-maintenance option for busy environments.

The method further includes step 410 of coupling a lighting portion to the light guide. The lighting portion is attached to one side of the light guide. More specifically, the lighting portion is coupled with a light entry side of the light guide, wherein the light generated by the lighting portion enters the light guide through the light entry side. The light is trapped inside the light guide and travels within the light guide to eventually exits through other sides of the light guide. In the third embodiment, the lighting portion includes a first cover and a second cover, wherein the first and second covers are both made of metal stainless steel (but not limited thereto).

The lighting portion further includes an integrated circuit board, at least one battery, and a charging interface. The battery can be a polymer lithium battery (but not limited thereto) electrically connected to the integrated circuit board and the charging interface. The integrated circuit board preferably has a control module, a resistor, a capacitor, and at least one light emitting diode. The batteries has a positive and a negative electrodes electrically connected to the positive and negative electrodes of the integrated circuit board. The integrated circuit board and the batteries are enclosed between the first and second covers, wherein the first cover has a power switch.

The method further includes step 420 of configuring the lighting portion to generate light that enters the light guide through the entry side. The lighting portion has a plurality of light sources, a battery, and a power switch. The light sources are preferably distributed along the light entry side of the light guide and electrically connected to the battery. The power switch is electrically connected to the battery and is used to complete the electrical circuit for the battery to power the light sources or break the electrical circuit so that the battery can stop powering the light sources. The lighting portion further includes a charger port electrically connected to the battery and configured to accept various types of Universal Serial Bus (USB) plugs or electrical plugs to charge the battery.

In different embodiments, the battery can also be replaceable. The lighting portion can also be configured to include a user interface configured to accept user input and change the color of light generated by the light sources. In the third embodiment, the power switch is a movable part, wherein a user can apply pressure on the power switch and move the power switch toward the integrated circuit board to complete an electrical circuit that includes the first cover, the integrated circuit board and the battery. A current can then flow around the above-mentioned circuit and especially the LED which can then start emitting light. Further, the first and second covers can shield external electric field.

Figure 7:
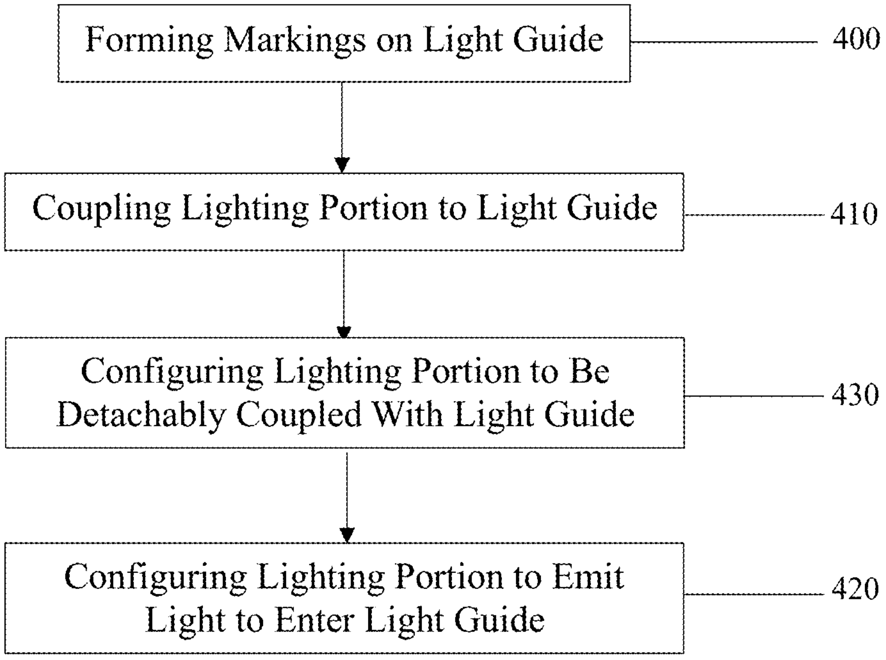
FIG. 7 is a flow chart of a method of making a ruler system according to a fourth embodiment of the present disclosure.

In the above-mentioned embodiment, the lighting portion is affixed on the light entry side of the light guide. However, according to the flow chart of FIG. 7 for making a ruler system, the method can further include step 430 of configuring the lighting portion to be detachably coupled with the light guide. For instance, the lighting portion can be fitted with a clip, either flexible or worked by a spring, for holding onto the light entry side of the light guide. One lighting portion configured to generate light of one color and be replaced with another lighting portion configured to generate light of another color. Accordingly, the user can freely change the lighting portion attached to the light guide to change the color of the light generated or the overall ornamental appearance of the ruler.

In the present embodiment, the ruler system includes a first lighting portion detachably coupled with the light entry side of the light guide and configured to generate light that enters the light guide through the light entry side. It is also important for the ruler to have a flat bottom surface so that when the ruler is placed on a piece of fabric it will not crook the fabric below. Thus, the first lighting portion has a flat bottom surface flush with the flat bottom surface of the light guide, when the first lighting portion is detachably coupled with the light guide. The first lighting portion has at least one first light source configured to generate light of one color such as red. In one embodiment, the first lighting portion can have the shape of a clip that be clipped on the light entry side while still being flush with the flat bottom surface of the light guide. In another embodiment, the first lighting portion can be identical to the lighting portion of the first embodiment, wherein the integrated circuit board, batteries, and charging interface can be replaced to form a lighting portion to generate light of different color.

As mentioned above, the first lighting portion is detachably coupled with the light guide and be decoupled from the light guide. Step 430 also includes replacing the above-mentioned first lighting portion with a second lighting portion. The second lighting portion has at least one second light source configured to generate light with color different from that of the light generated by the first light source. In different embodiments, the lighting portions have different texture designs and color on their respective surface. This allows the user to choose the lighting portion to be coupled with the light guide based on factors such as design and the color of light it generates etc.

Unless defined otherwise, all technical and scientific terms used herein have the same meaning as commonly understood to one of ordinary skill in the art to which this invention belongs. Although any methods, devices and materials similar or equivalent to those described can be used in practice or testing of the invention, the exemplary methods, devices and materials are now described.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The invention claimed is:

1. A measurement system, comprising:

a first ruler portion including a light guide having:

a flat first bottom surface;

a flat first top surface; and a light entry side between the first bottom surface and the first top surface;

a marking portion etched on the light guide and having a first set of measurement markings along a first axis and a second set of measurement markings along a second axis, the first axis is angularly disposed with respect to the second axis; and a first lighting portion disposed within a gap of the light guide and bordered by the light entry side, and two interior sides of the light guide, the first lighting portion connected to a first hook on the light entry side and a second hook on an interior side opposite to the light entry side, and configured to emit light to enter the light guide through the light entry side and illuminate the marking portion, such that the first set of measurement markings increment in a direction toward the first lighting portion away from an end of the light guide that is disposed at a position distal from the first lighting portion.

2. The measurement system of claim 1, wherein the first lighting portion is detachably coupled with the first ruler portion.

3. The measurement system of claim 1 further comprising a second lighting portion that can be detachably coupled with the first ruler portion, the first lighting portion includes a first texture, the second lighting portion includes a second texture.

4. The measurement system of claim 1, wherein the first lighting portion includes:

a light source;

a battery electrically connected to the light source and configured to power the light source to generate the light;

a power switch electrically connected to the battery for configuring the battery to power the light source; and a first cover attached to the first top surface and a second cover attached to the first bottom surface; wherein the light source, the battery, and the power switch are located between the first cover and the second cover.

5. The measurement system of claim 1, wherein the marking portion includes a plurality of measurement markings formed on the light guide.

6. The measurement system of claim 1, wherein the first lighting portion includes:

a light source;

a battery configured to power the light source to generate the light; and a power switch electrically connected to the battery for configuring the battery to power the light source.

7. The measurement system of claim 6, wherein the first lighting portion includes a charge port electrically connected to the battery, the charge port can be connected to a power source to receive electrical energy for charging the battery.

8. A measurement system, obtained by a process including steps of:

providing a first ruler portion, including:

a light guide having:

a flat first bottom surface;

a flat first top surface; and a light entry side between the first bottom surface and the first top surface; and a marking portion affixed on the light guide and having a first set of measurement markings along a first axis and a second set of measurement markings along a second axis;

coupling a first lighting portion within a gap of the light guide and bordered by the light entry side of the light guide and two interior sides of the light guide, the first lighting portion connected to a first hook on the light entry side and a second hook on an interior side opposite to the light entry side; and using the first lighting portion to emit light to enter the light entry side and illuminate the marking portion, such that the first set of measurement markings increment in a direction toward the first lighting portion away from an end of the light guide that is disposed at a position distal from the first lighting portion.

9. The measurement system of claim 8, wherein the step of providing the ruler portion includes forming the marking portion on the light guide, wherein the marking portion includes a plurality of measurement markings.

10. The measurement system of claim 8, wherein the first lighting portion includes a light source, a battery, and a power switch, the step of coupling the first lighting portion to the light guide includes:

electrically connecting the battery to the light source and the power switch;

disposing the light source, the battery, and the power switch on the light guide;

attaching a first cover to the first top surface of the light guide; and attaching a second cover to the first bottom surface of the light guide, wherein the light source, the battery, and the power switch are located between the first cover and the second cover.

11. The measurement system of claim 8, wherein the step of coupling the first lighting portion to the light guide includes configuring the first lighting portion to be detachably couplable with the first lighting portion with the light guide.

12. The measurement system of claim 11, wherein the process further includes:

detaching the first lighting portion from the light guide, wherein the first lighting portion includes a first texture; and detachably coupling a second lighting portion with the light guide, wherein the second lighting portion includes a second texture.

13. The measurement system of claim 8, wherein the process further includes:

disposing a light source, a battery, and a power switch on the first lighting portion; and electrically connecting the light source and the battery to the power switch, wherein the power switch is used to power the light sources or stop powering the light sources.

14. The measurement system of claim 13, wherein the process further includes electrically connecting a charger port to the battery, wherein the charger port can be connected to a power source to receive electrical energy for charging the battery.

15. A method of manufacturing a measurement system, comprising:

providing a first ruler portion, including:

a light guide having:

a flat first bottom surface;

a flat first top surface; and a light entry side between the first bottom surface and the first top surface; and a marking portion etched on the light guide and having a first set of measurement markings along a first axis and a second set of measurement markings along a second axis, the first axis is angularly disposed with respect to the second axis;

coupling a first lighting portion within a gap of the light guide and bordered by the light entry side of the light guide and two interior sides of the light guide, the first lighting portion connected to a first hook on the light entry side and a second hook on an interior side opposite to the light entry side; and using the first lighting portion to emit light to enter the light entry side and illuminate the marking portion, such that the first set of measurement markings increment in a direction toward the first lighting portion away from an end of the light guide that is disposed at a position distal from the first lighting portion.

16. The method of claim 15, wherein the step of coupling the first lighting portion to the light guide includes configuring the first lighting portion to be detachably couplable with the first lighting portion with the light guide.

17. The method of claim 15, wherein the step of providing the ruler portion includes forming the marking portion on the first bottom surface of the light guide, wherein the marking portion includes a plurality of measurement markings.

18. The method of claim 15, wherein first lighting portion includes a light source, a battery, and a power switch, the step of coupling the first lighting portion to the light guide includes:

electrically connecting the battery to the light source and the power switch;

disposing the light source, the battery, and the power switch of the first lighting portion on the light guide;

attaching a first cover to a first top surface of the light guide; and attaching a second cover to a first bottom surface of the light guide, wherein the light source, the battery, and the power switch are located between the first cover and the second cover.

19. The method of claim 15, further comprising steps of:

disposing a light source, a battery, and a power switch on the first ruler portion; and electrically connecting the light sources and the battery to the power switch, wherein the power switch is used to power the light source or stop powering the light sources.

20. The method of claim 19 further comprising electrically connecting a charger port to the battery, wherein the charger port can be connected to a power source to receive electrical energy for charging the battery.

* * * * *